W. M. GREENWOOD & J. N. CLARKE.
Rolls for Rolling Horseshoe Blanks.

No. 8,505. Reissued Nov. 26, 1878.

Attest:
Walter Knight
Harry C. Knight

Inventor:
William M. Greenwood,
John N. Clarke
By Knight Bros.
Attys.

N. PETERS, PHOTO-LITHOGRAPHER, WASHINGTON, D. C.

UNITED STATES PATENT OFFICE.

WILLIAM M. GREENWOOD AND JOHN N. CLARKE, OF CINCINNATI, OHIO.

IMPROVEMENT IN ROLLS FOR ROLLING HORSESHOE-BLANKS.

Specification forming part of Letters Patent No. 167,096, dated August 24, 1875; Reissue No. 8,505, dated November 26, 1878; application filed September 28, 1878.

DIVISION A.

*To all whom it may concern:*

Be it known that we, WILLIAM M. GREENWOOD and JOHN N. CLARKE, both of Cincinnati, Hamilton county, Ohio, have invented certain new and useful Improvements in Rolls for Making Horseshoe-Blanks, of which the following is a specification:

This invention relates to a new and useful machine for forming certain improved horseshoe-blanks described in reissue, Division B, of our patent for rolls for manufacturing horseshoe-blanks, dated 24th of August, 1875, No. 167,096.

The invention consists of a roll or rolls for the manufacture of horseshoe-blanks, comprising a series of preliminary grooves for forming a bar with central rib and fullered outer margin, and a finishing-groove adapted to form an inner flange or web and transverse depressions in the central rib.

Figure 1:
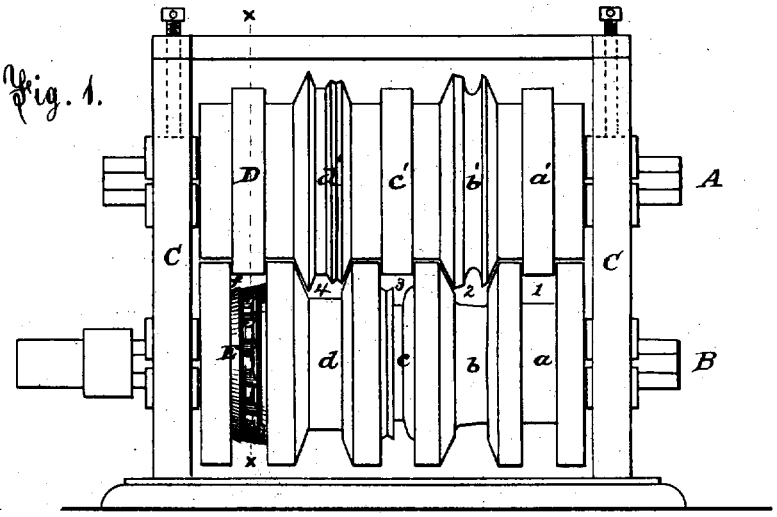
Figure 2:
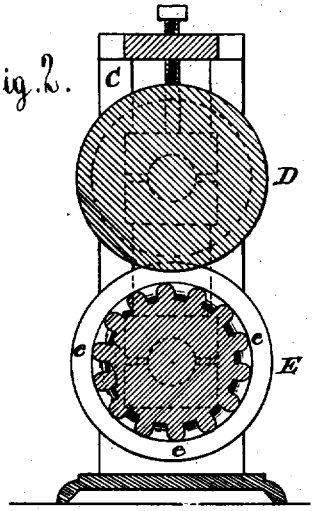
Figure 3:
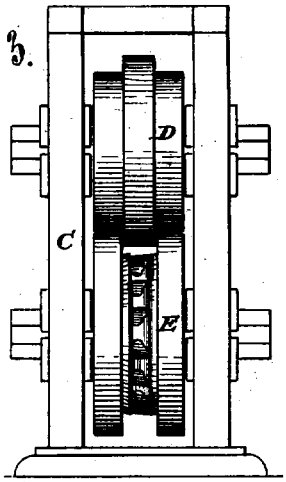
Figure 4:
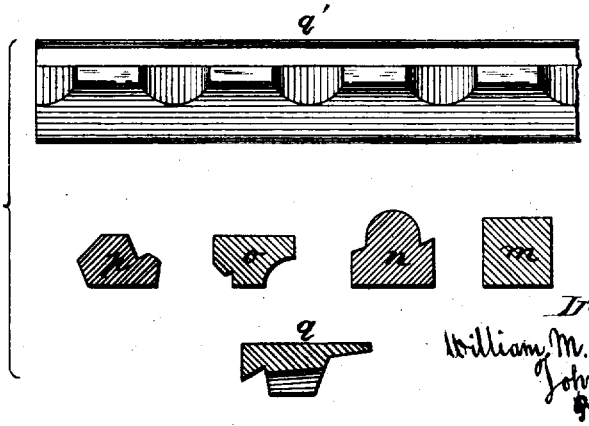

In the drawing, Figure 1 represents a front elevation of a set of rolls, showing my improvements. Fig. 2 represents a section through line *x x* of Fig. 1. Fig. 3 represents a front view of a modification of the rolls. Fig. 4 represents several detached views of the blank in process of formation.

At A B is represented a pair of rolls, journaled in suitable standards or housings C, in such relative positions that the dies on their peripheries will work properly together. The roll B is provided with a series of dies, *a b c d*, and the roll A with a series of counter-dies, *a′ b′ c′ d′*, by which the strip of metal or blank is gradually brought to the proper shape and dimensions preparatory to its passage between the corrugating-dies D and E. The said blank is formed by successive passes between the dies and counter-dies, beginning with *a* and *a′* and terminating with D and E.

The passes 1, 2, 3, and 4 have contours such as represented by the cross-sections *m*, *n*, *o*, and *p*, that will gradually and without detriment to the metal approximate the ultimate form desired. (Represented by cross-section at *q* and by under side profile at *q′*, Fig. 4.)

The dies D E are so formed as to produce a series of protuberances from end to end of the tread or sole side at or near its midwidth, a nail-crease or fullering near the outer margin, and a flattened web or fin at the inner margin of the blank. Projections or teeth *e* on the die E produce the desired indentations in the previously-prepared ridge, the surplus metal removed by said teeth aiding to fill out the said fin.

The die E is preferably formed around the periphery of the lower roll, B, and with its series of projections *e* at regular intervals apart. The counter-die D on the opposing roll has a plain face, which works face to face with the corrugated die E. The nail-crease is given its final form and depth by an angular shoulder, *f*, on the die E.

The operation of the rolls is as follows: The metallic bar is first passed between the dies *a* and *a′*, by which a shape in cross-section similar to that shown at 1 and at *m*, Fig. 4, is given. It is then passed between dies *b* and *b′*, which are so formed as to impart a shape like 2, or like *n*, in Fig. 4. It is then reversed and passed through the dies *c* and *c′*, taking the shape shown at 3, or at *o*, in Fig. 4. It is then brought to the proper shape for presentation to the finishing-dies by being passed between the dies *d* and *d′*, so as to produce a shape like 4, or like *p*, in Fig. 4. Finally, the bar is passed between the dies D and E, which produce the indentations in the median ridge, the nail-crease or fullering, and the inner marginal web or fin, and impart the finished form to the blank.

We claim as new and of our invention—

A roll or rolls for the manufacture of horseshoe-blanks, comprising a series of preliminary grooves, substantially as herein described, for forming a bar with central rib and fullered outer margin, and a finishing-groove adapted to form an inner flange or web and transverse depressions in the central rib, as and for the purpose described.

In testimony of which invention we hereunto set our hands.

WILLIAM M. GREENWOOD.
JOHN N. CLARKE.

Witnesses:
GEO. H. KNIGHT,
HARRY E. KNIGHT,